United States Patent
Song

(10) Patent No.: US 9,240,692 B2
(45) Date of Patent: Jan. 19, 2016

(54) POWER STORAGE SYSTEM AND METHOD OF DRIVING THE SAME

(71) Applicant: Samsung SDI Co., Ltd., Yongin-si, Gyeonggi-do (KR)

(72) Inventor: Hyun-Chul Song, Yongin-si (KR)

(73) Assignee: Samsung SDI Co., Ltd., Gyeonggi-do (KR)

( * ) Notice: Subject to any disclaimer, the term of this patent is extended or adjusted under 35 U.S.C. 154(b) by 159 days.

(21) Appl. No.: 14/086,893

(22) Filed: Nov. 21, 2013

(65) Prior Publication Data

US 2014/0347011 A1    Nov. 27, 2014

(30) Foreign Application Priority Data

May 27, 2013   (KR) .................. 10-2013-0059795

(51) Int. Cl.
*H02J 7/00* (2006.01)
(52) U.S. Cl.
CPC .................... *H02J 7/0014* (2013.01)
(58) Field of Classification Search
CPC ................. H02J 7/0014; H02J 7/02
USPC ............................................. 320/134
See application file for complete search history.

(56) References Cited

U.S. PATENT DOCUMENTS

| 8,633,619 B2 * | 1/2014 | Robinson et al. ............. 307/115 |
| 8,798,832 B2 * | 8/2014 | Kawahara et al. ............. 701/22 |
| 2011/0313613 A1 * | 12/2011 | Kawahara et al. ............. 701/29 |

FOREIGN PATENT DOCUMENTS

| JP | 2012-026742 A | 2/2012 |
| KR | 10-2012-0035714 A | 4/2012 |

* cited by examiner

*Primary Examiner* — Sun Lin
(74) *Attorney, Agent, or Firm* — Knobbe, Martens, Olson & Bear, LLP

(57) ABSTRACT

A power storage system and a method of driving the power storage system and preventing damages due to possible erroneous operations are disclosed. One inventive aspect includes a power converter that converts power, a power storage device that stores power and a main switch that is configured to switch between a charge path and a discharge path. The power storage system controls the main switch by sensing a connection between the power converter and the power storage device.

20 Claims, 4 Drawing Sheets

POWER STORAGE SYSTEM AND METHOD OF DRIVING THE SAME

CROSS-REFERENCE TO RELATED APPLICATIONS

This application claims priority to and the benefit of Korean Patent Application No. 10-2013-0059795 filed in the Korean Intellectual Property Office on May 27, 2013, the entire contents of which are incorporated herein by reference.

BACKGROUND

1. Field

The disclosed technology relates to a power storage system including one or more rechargeable battery cells and a method of driving the power storage system so as to prevent damage due to possible erroneous operations.

2. Description of the Related Technology

Because of possible environmental disruptions and limited natural resources, there are increasing interests in renewable power generation. However, generators may need to store power for efficiently use of the stored power during times of non-generation.

A power storage system can store generated power from new reproduction energy sources into a battery. It can also store power of a public utility's power plant in a battery by connecting the battery to the output of such a plant. Later on, the power storage system can supply the stored power back to the power plant or a downstream load.

After generated power from new reproduction energy sources or power of the commercial system is stored into a battery, the stored power can be retrieved when there is a power failure or when there is a problem on the power supply side. A device that stably supplies the stored power from a battery to a commercial generation system (or a load) is referred to as an uninterruptible power supply system (hereinafter, referred to as a UPS). In order to reduce data loss or information loss due to power failures, a UPS is usually used for computers or communication networks. In such a UPS, a power storage system is an essential constituent element.

A typical power storage system includes a battery and a power converter. The power converter converts power, which usually is stored in a battery, from one type to another type appropriate to a commercial generation system (or a load). Or it can convert power (e.g., generated from new reproduction energy sources) from a commercial generation system to power appropriate to the battery. The battery and the power converter are connected to each other. When the battery and the power converter are wrongly connected, a problem on a battery management system (hereinafter, referred to as a BMS) may occur. For example, the BMS may erroneously operate when it manages the battery, e.g., cell balancing charging and discharging.

The above information disclosed in this Background section is only for enhancement of understanding of the background of the disclosed technology and therefore it may contain information that does not form the prior art that is already known in this country to a person of ordinary skill in the art.

SUMMARY OF CERTAIN INVENTIVE ASPECTS

Embodiments of the disclosed technology has been developed to drive the power storage system with advantages of preventing an erroneous battery management operation. This erroneous operation may occur due to a wrong connection between a battery and a power converter.

An exemplary embodiment of the disclosed technology includes a power storage system. The power storage system includes a first terminal and second terminal to which a power converter that converts power is connected, a third terminal and fourth terminal to which a power storage device that stores power is connected, a main switch that is connected between the first terminal and the third terminal and that switches a charge or discharge path, and a voltage sensor that senses a first voltage, which is a voltage between the first terminal and the fourth terminal, wherein the power storage device includes a battery management system that controls the main switch, and the battery management system maintains the main switch in a turn-off state, when power of the battery management system is turned on, if the first voltage is larger than a reference voltage.

The battery management system may determine whether the first voltage that is sensed by the voltage sensor is larger than the reference voltage in a state in which the main switch is turned off, when power of the battery management system is turned on.

The battery management system may turn on the main switch for charge or discharge, if the first voltage is smaller than the reference voltage, when power of the battery management system is turned on.

The first terminal may be a positive potential terminal of the power converter, the second terminal may be a negative potential terminal of the power converter, the third terminal may be a positive potential terminal of the power storage device, and the fourth terminal may be a negative potential terminal of the power storage device.

The first voltage may be larger than the reference voltage, when the power converter is connected to the third terminal and the fourth terminal and the power storage device is connected to the first terminal and the second terminal.

The reference voltage may be set to a voltage lower than a normal output voltage in which the power storage device outputs.

The power converter may be a two-way inverter that converts DC power to AC power and that converts AC power to DC power.

Another embodiment of the disclosed technology includes a method of driving a power storage system. The method includes: providing a first terminal and a second terminal to which a power converter that converts power is connected, providing a third terminal and a fourth terminal to which a power storage device that stores power is connected, receiving a request for charge or discharge from the power converter, when power of the power storage system is turned on, sensing a voltage between the first terminal and the fourth terminal, and determining the charge or the discharge according to whether the sensed voltage is larger than a reference voltage.

The method may further include intercepting the charge or the discharge, if the sensed voltage is larger than a reference voltage.

The intercepting of the charge or the discharge may include intercepting the charge or the discharge by maintaining turning-off of a switch that is connected between the first terminal and the third terminal.

The sensing of a voltage may include sensing a voltage between the first terminal and the fourth terminal in a state in which turning-off of a switch is maintained.

The method may further include performing the charge or the discharge, if the sensed voltage is smaller than a reference voltage.

The first voltage may be larger than the reference voltage, when the power converter is connected to the third terminal and the fourth terminal and the power storage device is connected to the first terminal and the second terminal.

Another embodiment of the disclosed technology discloses an apparatus for operating a power storage system, the apparatus comprising means for connecting to a power converter, the power converter converting power, means for connecting to a power storage device, the power storage device further including a battery management system and configured to store power, means for switching between a charge path and a discharge path for the means for connecting to the power storage device, the means for switching controlled by the battery management system, and means for sensing a first voltage between the means for connecting to the power converter and the means for connecting to the power storage device.

In another implementation of the apparatus, the battery management system maintains the means for switching in a turn-off state. The battery management system is turned on and the first voltage is larger than a reference voltage.

In another implementation of the apparatus, the battery management system monitors the first voltage and determines whether the first voltage is larger than a reference voltage when the means for switching is turned off and the battery management system is turned on.

In another implementation of the apparatus, the battery management system turns on the means for switching when the first voltage is smaller than a reference voltage and the battery management system is turned on.

In another implementation of the apparatus, the means for connecting to the power converter further comprises a positive potential terminal of the power converter and a negative potential terminal of the power converter. The means for connecting to the power storage device further comprises a positive potential terminal of the power storage device and is a negative potential terminal of the power storage device.

In another implementation of the apparatus, the first voltage is larger than a reference voltage when the power converter is connected to the third terminal and the fourth terminal and the power storage device is connected to the first terminal and the second terminal.

In another implementation of the apparatus, the reference voltage is set to be lower than a normal output voltage outputted by the power storage device.

In another implementation of the apparatus, the power converter is a two-way inverter that converts DC power to AC power and/or converts AC power to DC power.

According to an exemplary embodiment of the disclosed technology, when a power storage device and a power converter are wrongly connected, by maintaining turning-off of a main switch, an erroneous operation of the power storage system can be prevented.

DETAILED DESCRIPTION OF CERTAIN INVENTIVE EMBODIMENTS

Figure 1:
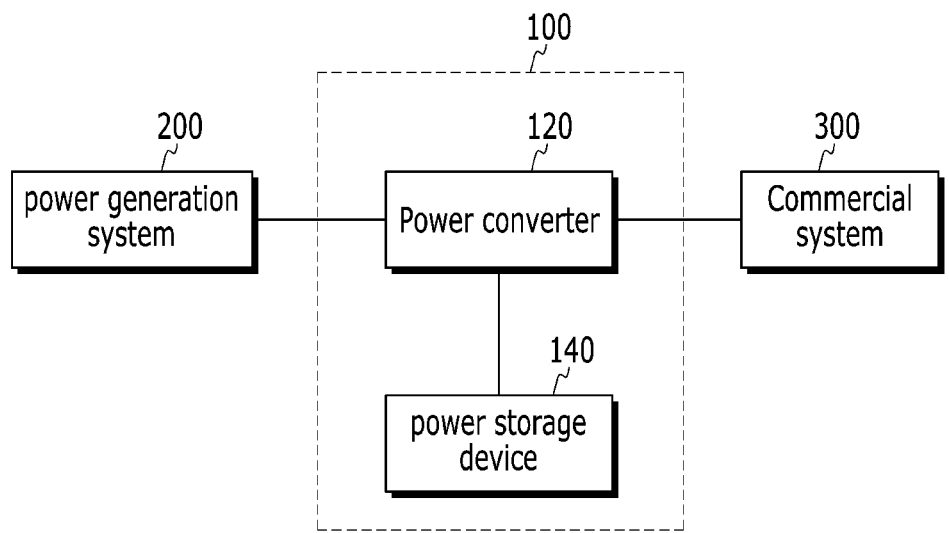
FIG. 1 is a diagram illustrating a connection relationship between a power storage system and a peripheral device according to an exemplary embodiment of the disclosed technology.

In the following detailed description, only certain exemplary embodiments of the disclosed technology have been shown and described, simply by way of illustration. As those skilled in the art would realize, the described embodiments may be modified in various different ways, all without departing from the spirit or scope of the disclosed technology. Accordingly, the drawings and description are to be regarded as illustrative in nature and not restrictive. Like reference numerals designate like elements throughout the specification.

The disclosed technology will be described more fully hereinafter with reference to accompanying drawings, in which exemplary embodiments are shown. As those skilled in the art would realize, the described embodiments may be modified in various different ways, all without departing from the spirit or scope of the disclosed technology.

In order to describe the disclosed technology more clearly, parts that are not related to the description will be omitted from the drawings, and the same symbols will be given to similar parts throughout the specification.

Furthermore, as the size and thickness of the respective structural components shown in the drawings are arbitrarily illustrated for explanatory convenience, the disclosed technology is not necessarily limited to as illustrated.

In the drawings, the thickness of layers, films, panels, regions, etc., are exaggerated for clarity. In the drawings, for understanding and ease of description, the thicknesses of some layers and areas are exaggerated. It will be understood that when an element such as a layer, film, region, or substrate is referred to as being "on" another element, it can be directly on the other element or intervening elements may also be present.

In addition, unless explicitly described to the contrary, the word "comprise" and variations such as "comprises" or "comprising" will be understood to imply the inclusion of stated elements but not the exclusion of any other elements. In addition, in the specification, the word "_on" means positioning on or below the object portion, but does not essentially mean positioning on the upper side of the object portion based on a gravity direction.

Further, in the specification, the phrase "on a flat surface" means when an object portion is viewed from the above, and the phrase "on a cross-section" means when a cross-section taken by vertically cutting an object portion is viewed from the side. Here, when a first element is described as being connected to a second element, the first element may be not only directly connected to the second element but may also be indirectly connected to the second element via a third element. Further, some of the elements that are not essential to the complete understanding of the disclosed technology are omitted for clarity. Also, like reference numerals refer to like elements throughout.

Throughout this specification and the claims that follow, when it is described that an element is "connected" to another element, the element may be "directly connected" to the other element or "electrically connected" to the other element through a third element. In addition, unless explicitly described to the contrary, the word "comprise" and variations such as "comprises" or "comprising," will be understood to imply the inclusion of stated elements but not the exclusion of any other elements.

Hereinafter, a power storage system and a method of driving the same according to an exemplary embodiment of the disclosed technology will be described in detail.

FIG. 1 is a diagram illustrating a connection relationship between a power storage system and a peripheral device according to an exemplary embodiment of the disclosed technology.

As shown in FIG. 1, a power storage system 100 according to an exemplary embodiment of the disclosed technology is connected to a power generation system 200 and a commercial system 300.

The power generation system 200 includes a system that generates electrical energy from new reproduction energy sources such as sun light, a wind force, wave energy, tidal energy, and a terrestrial heat. The power storage system 100 may include a commercial system, the new reproduction energy and/or the new reproduction energy sources.

The commercial power generation system 300 includes a power plant, a substation and a transmission site. The power plant can generate power through thermal generation, hydroelectric generation and nuclear generation, for example. The substation and/or the transmission site change voltage or current, e.g., via a step-down transformer, and send generated power through a power transmission line or a power distribution line.

FIG. 1 illustrates that the power storage system 100 is connected to the commercial system 300. In some implementations, a load is used to replace the commercial system 300. The load includes various electrical devices that consume power. It may include household appliances or a production equipment of a factory.

As shown in FIG. 1, the power storage system 100 according to an exemplary embodiment of the disclosed technology includes a power converter 120 and a power storage device 140.

The power converter 120 is connected to the power generation system 200 and the commercial system 300. The power converter 120 converts first power generated in the power generation system 200 to second power. The power convert 120 provides the second power to the power storage device 140. The first power generated by the power generation system 200 may be DC power or AC power. The second power provided by the power storage device 140 may be DC power. Therefore, the power converter 120 may be a DC-DC converter that converts the first power of DC to DC power or an AC-DC inverter that converts the first power of AC to DC power.

The power converter 120 may convert DC power stored in the power storage device 140 to AC power and provide the AC power to the commercial system 300. In this case, the power converter 120 may be a DC-AC inverter that converts DC power to AC power.

In another exemplary implementation, the power converter 120 is able to convert AC power to DC power and convert DC power to AC power. In an exemplary implementation, the power converter 120 may be embodied in a two-way converter.

The power storage device 140 stores DC power supplied from the power converter 120. When a power failure happens, the power storage device 140 will supply the stored DC power to the power converter 120. During a power failure, the power storage device 140 supplies DC power to the power converter 120. The power converter 120 converts DC power to AC power and supplies the AC power to the commercial system 300 or a load (not shown). Therefore, even during a power failure, safety power will still be supplied to the commercial system 300 or a load.

Even when there is no power failure, the power storage device 140 may still supply stored power to the power converter 120. In an exemplary implementation, power supplied from the power generation system 200 is always transferred to the commercial system 300 or a load through the power storage device 140.

The power storage system 100 according to an exemplary embodiment of the disclosed technology will be described in detail with reference to FIG. 2.

Figure 2:
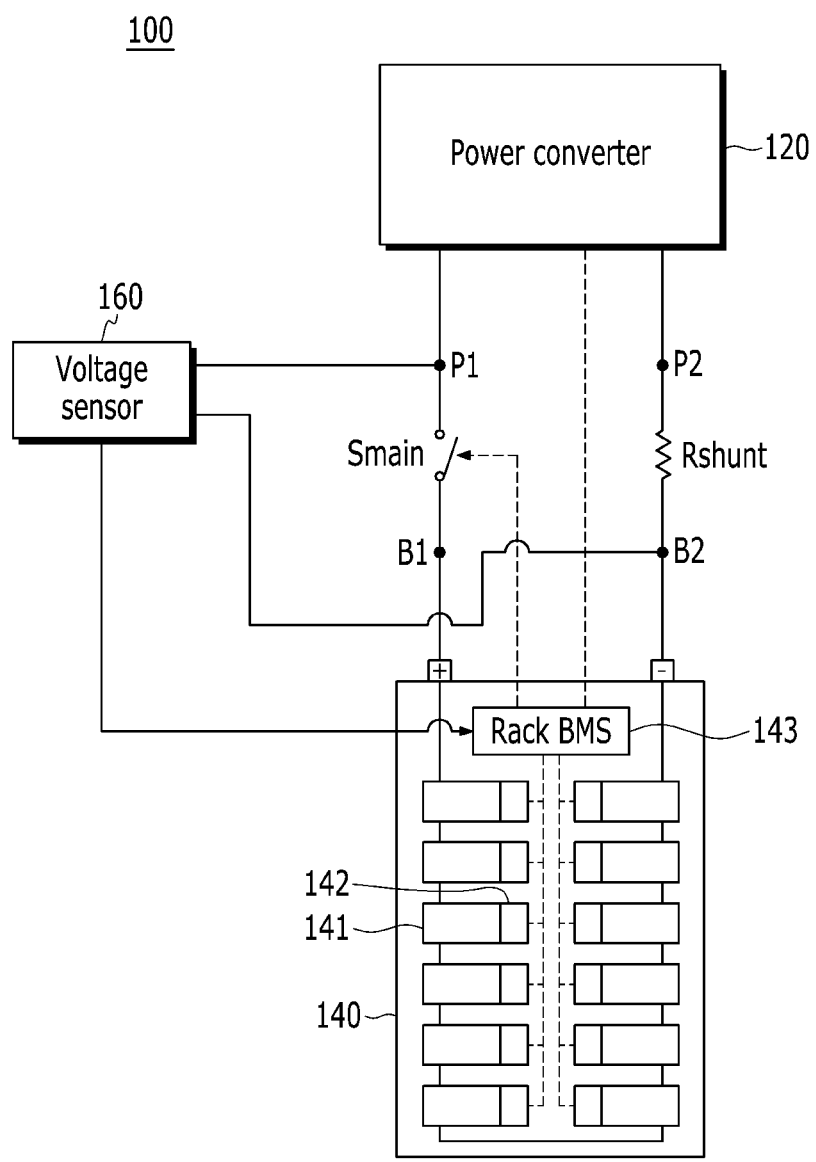
FIG. 2 is a diagram illustrating an internal configuration of a power storage system according to an exemplary embodiment of the disclosed technology.

FIG. 2 is a diagram illustrating an internal configuration of the power storage system 100 according to an exemplary embodiment of the disclosed technology.

As shown in FIG. 2, the power storage system 100 according to an exemplary embodiment of the disclosed technology includes a power converter 120, a power storage device 140, a voltage sensor 160, a main switch Smain and a shunt resistor Rshunt. In FIG. 2, a flow of a voltage and a current is designated by a solid line and a flow of a measurement signal and a switching control signal of a battery management system is designated by a dotted line. B1 and B2 are a positive potential terminal and a negative potential terminal of the power storage device 140, respectively. P1 and P2 are a positive potential terminal and a negative potential terminal of the power converter 120, respectively.

As described above, the power converter 120 converts power supplied to the power generation system 200 and supplies the converted power to the power storage device 140. The power converter 120 converts power supplied from the power storage device 140 and supplies the converted power to the commercial system 300 or a load.

The power storage device 140 includes a plurality of battery packs 141, a plurality of tray battery management systems 142 (hereinafter, referred to as a 'tray BMS') and a rack battery management system 143 (hereinafter, referred to as a 'rack BMS').

As shown in FIG. 2, the plurality of battery packs 141 are connected in series to each other and are connected to a positive terminal (+) and a negative terminal (−). A power line is connected to the positive terminal (+) and the negative terminal (−). In other words, the plurality of battery packs 141 are connected in series and output power to the power line through the positive terminal (+) and the negative terminal (−). The battery pack 141 includes a plurality of cells that are connected in series or in parallel. In addition, a cell is a rechargeable battery that can be repeatedly charged and discharged. The cell may be a nickel-cadmium battery, a lead storage battery, a nickel metal hydride battery, a lithium ion battery and a lithium polymer battery.

The plurality of tray BMSs 142 each manage charges and discharges of the battery pack 141. The rack BMS 143 manages charges and discharges of the entire power storage device 140. FIG. 2 illustrates that the tray BMS 142 is provided in the each battery pack 141. The tray BMS 142 may be provided to manage charge and discharge of the plurality of battery packs 141.

The tray BMS 142 measures a voltage, a current and a temperature of each cell included in the battery pack 141 and transfers information of the voltage, the current and the temperature to the rack BMS 143. The rack BMS 143 estimates a state of charge (SOC) and a state of health (SOH) of each cell or each battery pack 141 through analyzing the information of the voltage, the current and the temperature of each cell and thus controls charges and discharges of the entire power storage device 140. The information is transferred from the each tray BMS 142 to the rack BMS 143.

The tray BMS 142 estimates a SOC and a SOH of each cell by measuring voltage, current and temperature of each cell and transfers the estimated SOC and SOH together with information of the voltage, the current and the temperature of the each cell to the rack BMS 143. The rack BMS 143 controls charges and discharges of the entire power storage device 140 based on the SOC and SOH transferred from the tray BMS 142.

The rack BMS 143 senses whether an error occurs in a voltage and a current of the each battery pack 141 or the entire power storage device 140 based on information of voltage, current and temperature of each cell and the information is transferred from the each tray BMS 142. When an error is sensed in the battery pack 141 or the power storage device 140, the rack BMS 143 intercepts the main switch Smain by transferring a switching control signal to the main switch Smain and thereby protects a battery. The rack BMS 143 exchanges a control signal that relates to charges and/or discharges with the power converter 120 through CAN communication.

When an error occurs in the rack BMS 143, one of the tray BMSs 142 may replace a function of the rack BMS 143. The tray BMS 142 that performs a function of the rack BMS 143 detects an error on a voltage and a current of the power storage device 140 and transfers a switching control signal to the main switch Smain.

The rack BMS 143 according to an exemplary embodiment of the disclosed technology receives a sensing voltage Vdetect that is sensed by the voltage sensor 160 from the voltage sensor 160. When power of the rack BMS 143 is turned on and a sensing voltage sensed by the voltage sensor 160 exceeds a reference voltage, the rack BMS 143 maintains the main switch Smain in a turn-off state. This will be described in detail with reference to FIGS. 3 and 4.

The main switch Smain is connected to the positive potential terminal P1 of the power converter 120 and the positive potential terminal B1 of the power storage device 140. The main switch Smain sets a charge and discharge path of the power storage device 140. In order to set a charge path and a discharge path, the main switch Smain may be embodied through a transistor that is connected by back-to-back.

The resistor Rshunt is connected to the negative potential terminal P2 of the power converter 120 and the negative potential terminal B2 of the power storage device 140. The resistor Rshunt is used for measuring a current flowing through the power storage device 140.

In order for the voltage sensor 160 to sense a case in which the power converter 120 and the power storage device 140 are wrongly connected when power of the voltage sensor 160 is turned on, the voltage sensor 160 senses a voltage difference between the positive potential terminal P1 of the power converter 120 and the negative potential terminal B2 of the power storage device 140. The voltage sensor 160 transmits the sensed sensing voltage Vdetect to the rack BMS 143. When a sensing voltage Vdetect exceeds a reference voltage, the rack BMS 143 maintains the main switch Smain in a turn-off state.

Figure 3:
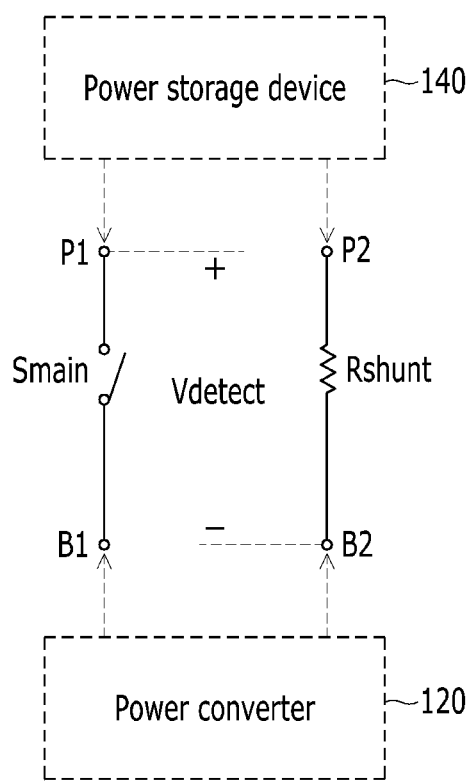
FIG. 3 is a diagram illustrating a case in which a power converter and a power storage device are wrongly connected.

FIG. 3 is a diagram illustrating a case in which the power converter 120 and the power storage device 140 are wrongly connected.

As shown in FIG. 2, it is an accurate connection that the power converter 120 is connected to the positive potential terminal P1 and the negative potential terminal P2 of the power converter 120 and that the power storage device 140 is connected to the positive potential terminal B1 and the negative potential terminal B2 of the power storage device 140. However, as shown in FIG. 3, by a mistake, the power storage device 140 may be connected to the positive potential terminal P1 and the negative potential terminal P2 of the power converter 120 or the power converter 120 may be connected to the positive potential terminal B1 and the negative potential terminal B2 of the power storage device 140. As shown in FIG. 3, when the power converter 120 and the power storage device 140 are wrongly connected, a charge current and a discharge current are wrongly measured and thus a problem may occur. For example, a problem of the rack BMS 143 or the tray BMS 142 of the power storage device 140 may happen.

Therefore, in order to prevent such a wrong connection case, when power of the voltage sensor 160 is turned on, the voltage sensor 160 according to an exemplary embodiment of the disclosed technology senses a sensing voltage Vdetect. The sensing voltage Vdetect is a voltage between the positive potential terminal P1 of the power converter 120 and the negative potential terminal B2 of the power storage device 140. When a connection is mistakenly performed, as shown in FIG. 3, the sensing voltage Vdetect becomes an output voltage of the power storage device 140 and thus a reference voltage may be set as a voltage lower than a normal output voltage of the power storage device 140.

Figure 4:
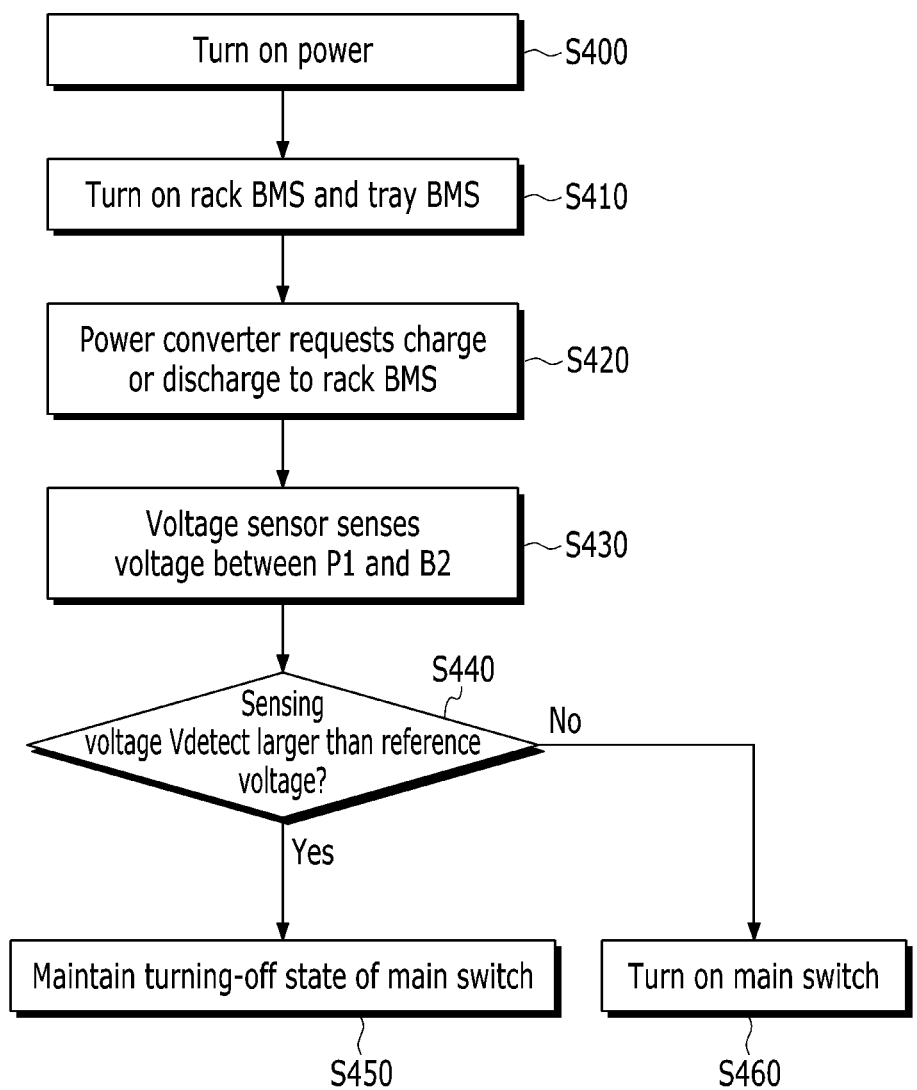
FIG. 4 is a flowchart illustrating a method of operating a power storage system when power of the power storage system is turned on according to an exemplary embodiment of the disclosed technology.

FIG. 4 is a flowchart illustrating a method of operation the power storage system 100 when power of the power storage system 100 is turned on according to an exemplary embodiment of the disclosed technology.

First, when power of the power storage system 100 is turned on (S400), the rack BMS 143 and the tray BMS 142 are turned on and stand by communication with the power converter 120 (S410).

Thereafter, when the power converter 120 transmits a message that requests charge or discharge to the rack BMS 143 through CAN communication (S420), the voltage sensor 160 measures a sensing voltage Vdetect. The sensing voltage Vdetect is a voltage between the positive potential terminal P1 of the power converter 120 and the negative potential terminal B2 of the power storage device 140 (S430). When the voltage sensor 160 senses a sensing voltage, the rack BMS 143 maintains the main switch Smain in a turn-off state. That is, the voltage sensor 160 measures a sensing voltage in a state in which the main switch Smain is turned off.

The rack BMS 143 compares a sensing voltage Vdetect that is transmitted from the voltage sensor 160 with a preset reference voltage (S440).

If a sensing voltage Vdetect is smaller than a reference voltage, the rack BMS 143 turns on the main switch Smain for charge or discharge (S460). That is, when a sensing voltage Vdetect is smaller than a reference voltage, a connection between the power converter 120 and the power storage device 140 is not wrong and thus the main switch Smain is turned on and a normal charge or discharge operation is performed.

If a sensing voltage Vdetect is larger than a reference voltage, in order to prevent a charge or discharge operation, the rack BMS 143 maintains a turning-off state of the main switch Smain (S450). That is, if a sensing voltage Vdetect is larger than a reference voltage, a connection between the power converter 120 and the power storage device 140 is wrong and thus the main switch Smain maintains a turn-off state, thereby preventing an erroneous operation of the power storage system 100.

For purposes of summarizing the disclosed technology, certain aspects, advantages and novel features of the disclosed technology have been described herein. It is to be understood that not necessarily all such advantages may be achieved in accordance with any particular embodiment of the disclosed technology. Thus, the disclosed technology may be embodied or carried out in a manner that achieves or optimizes one advantage or group of advantages as taught herein without necessarily achieving other advantages as may be taught or suggested herein.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A power storage system, comprising:
   a first terminal and a second terminal connected to a power converter, the power converter configured to convert power;
   a third terminal and a fourth terminal connected to a power storage device, the power storage device including a battery management system and configured to store power;
   a main switch connected to the first terminal and the third terminal and configured to switch between a charge path and a discharge path, the main switch controlled by the battery management system; and
   a voltage sensor configured to sense a first voltage between the first terminal and the fourth terminal.

2. The power storage system of claim 1, wherein the battery management system maintains the main switch in a turn-off state, when the battery management system is turned on and the first voltage is larger than a reference voltage.

3. The power storage system of claim 2, wherein the reference voltage is set to be lower than a normal output voltage outputted by the power storage device.

4. The power storage system of claim 1, wherein the battery management system monitors the first voltage and determines whether the first voltage is larger than a reference voltage when the main switch is turned off and the battery management system is turned on.

5. The power storage system of claim 1, wherein the battery management system turns on the main switch when the first voltage is smaller than a reference voltage and the battery management system is turned on.

6. The power storage system of claim 1,
   wherein the first terminal is a positive potential terminal of the power converter,
   wherein the second terminal is a negative potential terminal of the power converter,
   wherein the third terminal is a positive potential terminal of the power storage device, and wherein the fourth terminal is a negative potential terminal of the power storage device.

7. The power storage system of claim 1, wherein the first voltage is larger than a reference voltage when the power converter is connected to the third terminal and the fourth terminal, and the power storage device is connected to the first terminal and the second terminal.

8. The power storage system of claim 1, wherein the power converter is a two-way inverter that converts DC power to AC power and/or converts AC power to DC power.

9. A method of driving a power storage system, the method comprising:
   connecting to a power converter, the power converter configured to convert power;
   connecting to a power storage device, the power storage device configured to store power;
   receiving a request for a charge or a discharge from the power converter;
   sensing a voltage between a first terminal connected to the power converter and a fourth terminal connected to the power storage device; and
   determining the charge or the discharge at least partially based on the sensed voltage and a reference voltage.

10. The method of claim 9, further comprising intercepting the charge or the discharge when the sensed voltage is larger than the reference voltage.

11. The method of claim 10, wherein the intercepting further comprises intercepting the charge or the discharge by maintaining a turn-off state of a switch that is connected to the first terminal and a third terminal, the third terminal connected to the power storage device.

12. The method of claim 9, wherein the sensing comprises sensing the voltage when a switch connected to the first terminal and the fourth terminal is maintained in a turn-off state.

13. The method of claim 9, further comprising performing the charge or the discharge when the sensed voltage is smaller than the reference voltage.

14. The method of claim 9,
   wherein the first terminal is a positive potential terminal of the power converter,
   wherein a second terminal connected to the power converter is a negative potential terminal of the power converter,
   wherein a third terminal connected to the power storage device is a positive potential terminal of the power storage device, and wherein the fourth terminal is a negative potential terminal of the power storage device.

15. The method of claim 14, wherein the first voltage is larger than the reference voltage when the power converter is connected to the third terminal and the fourth terminal, and the power storage device is connected to the first terminal and the second terminal.

16. An apparatus for operating a power storage system, the apparatus comprising:
   means for connecting to a power converter, the power converter for converting power;
   means for connecting to a power storage device, the power storage device including a battery management system and configured to store power;
   means for switching between a charge path and a discharge path for the means for connecting to the power storage device, the means for switching controlled by the battery management system; and
   means for sensing a first voltage between the means for connecting to the power converter and the means for connecting to the power storage device.

17. The apparatus of claim 16, wherein the battery management system maintains the means for switching in a turn-off state, when the battery management system is turned on and the first voltage is larger than a reference voltage.

18. The apparatus of claim 16, wherein the battery management system monitors the first voltage and determines whether the first voltage is larger than a reference voltage when the means for switching is turned off and the battery management system is turned on.

19. The apparatus of claim 16, wherein the battery management system turns on the means for switching when the first voltage is smaller than a reference voltage and the battery management system is turned on.

20. The apparatus of claim 16, wherein the means for connecting to the power converter further comprises a positive potential terminal of the power converter and a negative potential terminal of the power converter, and wherein the means for connecting to the power storage device further comprises a positive potential terminal of the power storage device and is a negative potential terminal of the power storage device.

* * * * *